Dec. 25, 1962  O. R. NEMETH  3,069,968
MOTION PICTURE SHUTTER
Filed Aug. 18, 1958

INVENTOR.
OTTO R. NEMETH
BY *Elliott & Pastoriza*
ATTORNEYS.

United States Patent Office 3,069,968
Patented Dec. 25, 1962

3,069,968
MOTION PICTURE SHUTTER
Otto R. Nemeth, Santa Monica, Calif., assignor, by mesne assignments, to Mansfield Industries, Inc., Chicago, Ill., a corporation of Delaware
Filed Aug. 18, 1958, Ser. No. 755,520
2 Claims. (Cl. 88—19.3)

This invention generally relates to improved motion picture shutter apparatus, and more particularly concerns an improved barrel type shutter construction in conjunction with a simplified optical system and combined simplified driving means for advancing film as well as rotating the shutter itself.

Conventional barrel type shutters, for example, as shown in Pat. No. 2,647,435, entitled "Motion Picture Projector," have been embodied in relatively few motion picture projectors despite the fact that such shutters are relatively economical to manufacture and are susceptible of combination with simplified driving means. Although the utility of such shutters is recognized, their application has been limited to amusement type or toy projectors in which annoying light flicker does not pose as serious a problem as with more expensive projectors.

In this regard, it is a primary object of the present invention to provide in a motion picture projector a barrel type shutter which is inherently constructed to produce significantly no noticeable light flicker, and yet which may be economically manufactured and assembled with simplified driving means.

Another object of the present invention is to provide in a motion picture camera a barrel type shutter means which is uniquely adaptable to a simplified optical system.

Another object of the present invention is to provide a barrel type shutter for a motion picture camera, in which the shutter may be directly driven from the same shaft as the film advancing mechanism.

Still another object of the present invention is to provide in a motion picture camera a barrel type shutter enabling a greater amount of light to be directed on the film when the shutter is in an open position.

These and other objects and advantages of the present invention are generally attained by providing in a motion picture projector having a film passage, light source means with reflector means positioned on one side thereof with preferably the reflector means and the light source means being embodied in a unitary lamp construction. Rotatable barrel shutter means are positioned with the axis thereof parallel to the film passage on the other side of the light source means and adjacent to the film passage.

The barrel shutter means includes at least one blade which is radially spaced from the axis thereof, with the blade upon rotation of the shutter means having a first given circumferential position substantially parallel to and at a minimum distance from the film passage, and a given second circumferential position at a maximum distance from the film passage and spaced 180° from the first position.

The light source means and the reflector means are co-operatively designed to create a cone of light rays or space angle of light converging towards the barrel shutter means. The cone of light is such as to be totally eclipsed by the blade when the latter is disposed in its first position and only partially eclipsed by the blade when it is disposed in its second position. In addition, driving means are coupled to the axis of the barrel shutter means for rotation thereof.

A better understanding of the present invention will be had by reference to the drawings showing an illustrative embodiment only, and in which.

Figure 1:
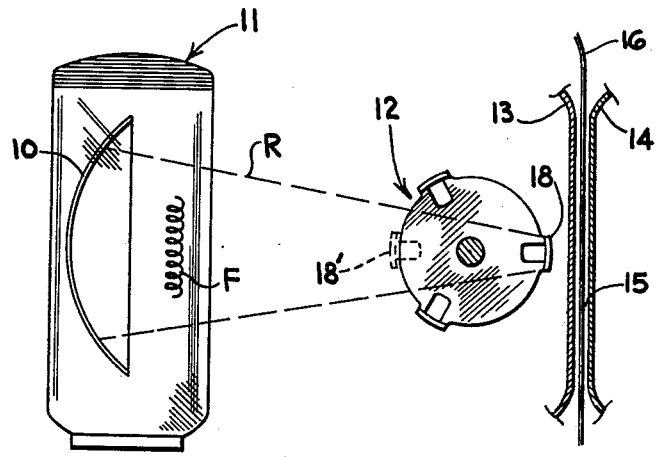
FIGURE 1 is a partial schematic representation of a portion of a motion picture projector embodying the shutter means of the present invention.

Referring now to FIGURE 1, there is shown a reflector 10 embodied in a lamp 11 including a filament F. Such lamps are relatively new in the art and are sold, for example, by Sylvania Electric Products, Inc. Such lamps are designed to reflect a relatively wide angle cone or solid angle of light towards the film gate. It will be appreciated, however, that the present invention is not limited to application with lamps containing integral reflectors, but may be employed with lamps co-operating with separate reflectors so long as a relatively wide angle cone of light is produced.

As indicated in FIGURE 1, the cone of light R is directed towards the barrel shutter means 12 of the present invention. The barrel shutter means 12 is positioned adjacent the side walls of a lamp housing 13 or the like. The lamp housing 13 defines together with a projection lens housing 14 a film passage 15 accommodating film 16 to be advanced therethrough. Conventional motion picture projector structures such as the light aperture, film gate, projector lens assembly, and the like have not been shown, although it will be appreciated that such parts are well known in the art.

Figure 2:
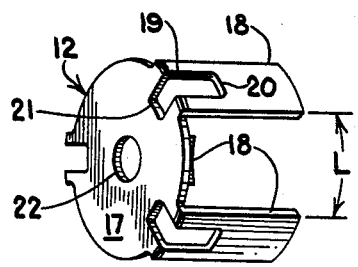
FIGURE 2 is an isometric view of the shutter means shown in FIGURE 1.
Figure 3:
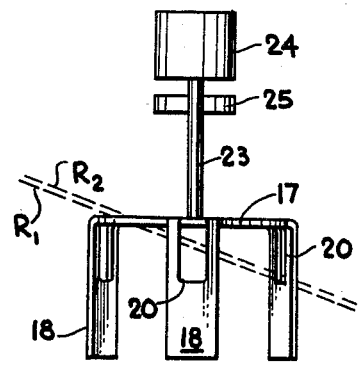
FIGURE 3 is a top elevational view of the shutter means of FIGURE 1 shown in schematic connection to driving means and film advancing means employed with the projector.

An understanding of the shutter means 12 and the manner in which it functions together with the cone of light R will be more evident by reference to FIGURES 2 and 3. The barrel shutter means 12 comprises a circular end member 17, which has integrally formed therewith a plurality of arcuately shaped blade members 18 extending normally in an axial direction therefrom. The blade members 18 are preferably equally spaced about the circumference of the end member 17, although modifications may be made with respect to spacing according to the optical system employed and the optical effect desired. The angular distance between blades has been designated by the letter L and primarily accounts for the transmission of light through the shutter when one of the blades 18 is not disposed within the boundary of the cone R.

In a preferred construction, each of the blades 18 is provided at its inner end portion 19 with a window 20. Preferably, the window 20 continues into the plane of the end member 17 to form a radial opening 21 therein. The windows 20 and openings 21 enable a greater proportion of the light in the cone R to pass through the shutter onto the film 16 as a particular frame is being projected. The significance of the windows 20 and openings 21 will be better appreciated when the operation of the shutter means is further described.

The end member 17 is provided with an opening 22 to receive a shaft 23, as shown in FIGURE 3. The shaft 23 is directly coupled to a driving motor 24. The driving motor 24 may be the conventional electric motor included with the camera. The shaft 23 has also directly coupled thereto cam means, schematically designated by the numeral 25 for advancing the film, although other equivalent film advancing mechanims may be employed.

In operation, when the shutter means 12 is disposed in the position of FIGURE 1 with one of the blades 18 positioned at its minimum distance from the film passage 15, the light from the cone R will be eclipsed, and the film 16 will be advanced in the usual manner by the film advancing means 25. Normally, the film advancing means 25 requires an angular rotation of some thirty to forty degrees. With the shutter means design of the present invention, the shutter means 12 will rotate one revolution every time the cam means 25 rotates a single revolution. Thus, the blade 18 is designed to have sufficient arcuate width to eclipse the film aperture (not shown) and also to close off the aperture while the individual frames of the film are being advanced. The arcuate width of the blade 18 will, therefore, vary according to the distance of the blade from the film aperture as well as the optical system employed.

In any event, by employing a wide angle cone R, it is evident from FIGURE 1 that when one of the blades 18 moves clockwise to the dotted line position 18' at a maximum distance from the film passage 15, that the cone of light R will have only a very small portion thereof obstructed by the blade. In consequence, except when one of the blades 18 is disposed adjacent the film passage 15, only a very minimum amount of light will be prevented from passing through the shutter means 12.

In order to further decrease the possible interference of the blade means 18 with light transmission, the windows 20 and radial openings 21 are provided. Referring now to FIGURE 3, it will be seen that the light rays R1, R2, for example, will pass through one of the openings 21 and thereafter through one of the windows 20 even assuming that one of the blades 18 is disposed in the dotted line position of FIGURE 1. Of course, other light rays will be passing downwardly and at other angles through the shutter means 12.

Because the cam means 25 and shutter means 12 are each revolving at the same rate, no gearing is required and a very simplified direct drive is possible. Furthermore, by employing a three blade shutter unit, light flicker which varies as a function of light intensity and frequency will be held to a minimum.

It will thus be evident that applicant has provided an improved barrel type shutter means, which enables the use of a simplified driving mechanism and yet which is uniquely adaptable to a further simplified optical system for a motion picture projector.

What is claimed is:

1. In a motion picture projector including a film passage, the combination comprising: light source means; reflector means positioned on one side of said light source means; rotatable barrel shutter means axially parallel to said film passage and positioned on the other side of said light source means adjacent said film passage; three circumferentially spaced blades carried by said barrel shutter means and radially spaced from the axis thereof, said blades upon rotation of said barrel shutter means each having a given first circumferential position substantially parallel to and at a minimum distance from said film passage and a given second circumferential position at a maximum distance from said film passage and spaced 180° from said first position; said light source means and said reflector means being cooperatively designed to create a wide angle cone of light rays converging towards said barrel shutter means, said cone of light being totally eclipsed by each of said blades in said first position and only a small portion thereof being eclipsed by each of said blades in said second position; and driving means coupled to said barrel shutter means for rotation thereof.

2. In a motion picture projector, a barrel shutter means comprising: a circular base member adapted to be rotatively driven about its axis; three elongated blade members integrally formed with an extending normally in one direction from the periphery of said base member in circumferentially spaced relationship to define therebetween light emitting openings, each of said blades defining an inner window in its end portion adjacent said base member, said windows extending from said blades angularly into the plane of said base member a given radial distance.

References Cited in the file of this patent
UNITED STATES PATENTS

| | | |
|---|---|---|
| 1,106,069 | Anderson | Aug. 4, 1914 |
| 1,312,722 | Clark | Aug. 22, 1919 |
| 1,386,198 | Parret | Aug. 2, 1921 |
| 1,523,160 | Asbury | Jan. 13, 1925 |
| 1,885,631 | Sapier | Nov. 1, 1932 |
| 2,227,592 | La Vezzi | Jan. 7, 1941 |
| 2,601,347 | Waller | June 24, 1952 |
| 2,764,910 | Tole et al. | Oct. 2, 1956 |